US007661589B2

(12) United States Patent
Atobe et al.

(10) Patent No.: US 7,661,589 B2
(45) Date of Patent: Feb. 16, 2010

(54) SECURITY MANAGEMENT SOFTWARE, PRINT CONTROL DEVICE, AND SECURITY MANAGEMENT METHOD OF PRINT CONTROL DEVICE

(75) Inventors: Hiroshi Atobe, Richmond (GB); Kenji Takahashi, Ealing (GB)

(73) Assignee: Canon Europa NV, Amstelveen (NL)

( * ) Notice: Subject to any disclaimer, the term of this patent is extended or adjusted under 35 U.S.C. 154(b) by 516 days.

(21) Appl. No.: 11/360,561

(22) Filed: Feb. 24, 2006

(65) Prior Publication Data

US 2006/0226218 A1 Oct. 12, 2006

(30) Foreign Application Priority Data

Feb. 25, 2005 (GB) ................................ 0503977.1

(51) Int. Cl.
*G06K 5/00* (2006.01)
*G06K 15/00* (2006.01)
*G06F 21/00* (2006.01)
*H04L 9/32* (2006.01)

(52) U.S. Cl. ...................... 235/382; 358/1.14; 713/186; 726/2

(58) Field of Classification Search ................. 235/382; 358/1.14; 713/186; 726/2; 382/124; 340/5.83
See application file for complete search history.

(56) References Cited

U.S. PATENT DOCUMENTS

| | | | | |
|---|---|---|---|---|
| 5,892,900 | A * | 4/1999 | Ginter et al. | 726/26 |
| 6,133,914 | A | 10/2000 | Rogers et al. | |
| 6,205,287 | B1 | 3/2001 | Takahashi et al. | |
| 6,741,729 | B2 * | 5/2004 | Bjorn et al. | 382/124 |
| 2002/0105666 | A1 | 8/2002 | Sesek | |
| 2002/0186253 | A1 | 12/2002 | Rodden et al. | |
| 2003/0012415 | A1 | 1/2003 | Cossel | |
| 2003/0095691 | A1 | 5/2003 | Nobuhara et al. | |
| 2003/0107771 | A1 * | 6/2003 | Shibata | 358/3.28 |
| 2003/0212709 | A1 * | 11/2003 | De Schrijver | 707/104.1 |
| 2004/0213612 | A1 | 10/2004 | Hanaoka | |
| 2005/0024674 | A1 | 2/2005 | Fujishige et al. | |
| 2005/0144482 | A1 * | 6/2005 | Anuszewski | 713/201 |
| 2006/0203255 | A1 | 9/2006 | Takaragi et al. | |
| 2006/0209337 | A1 | 9/2006 | Atobe et al. | |
| 2006/0232814 | A1 | 10/2006 | Shao et al. | |
| 2007/0014442 | A1 * | 1/2007 | Yu | 382/124 |

FOREIGN PATENT DOCUMENTS

| | | |
|---|---|---|
| EP | 0 249 399 | 12/1987 |
| EP | 0 537 097 | 4/1993 |
| EP | 1 174 787 | 1/2002 |
| GB | 2 331 820 | 6/1999 |
| JP | 2003-195704 | 7/2003 |

* cited by examiner

*Primary Examiner*—Michael G Lee
*Assistant Examiner*—Suezu Ellis
(74) *Attorney, Agent, or Firm*—Fitzpatrick, Cella, Harper & Scinto

(57) ABSTRACT

A security management software is executed in print control device connectable via a network to an information processing device that sends an instruction and data thereto. The software includes: a step of relating a fingerprint of a user of the print control device to information registered for security authentication system on the print control device, wherein the information is to log into the print control device; and a step of allowing the user to log into the print control device, in case that a fingerprint of the user inputted for logging into the print control device is authenticated based on the related fingerprint.

12 Claims, 9 Drawing Sheets

SECURITY MANAGEMENT SOFTWARE, PRINT CONTROL DEVICE, AND SECURITY MANAGEMENT METHOD OF PRINT CONTROL DEVICE

BACKGROUND OF THE INVENTION

1. Field of the Invention

The present invention relates to a print control device connectable via a network to an information processing device that sends an instruction and data thereto and the information processing device connectable via the network to the print control device that receives an instruction and data therefrom.

2. Description of the Related Art

MFP (Multi Function Peripheral) connected to a network needs to enhance its security with a user authentication system, since MFP is shared in an office and processes many confidential information. MFP has the platform software as core software of MFP and executes a plurality of application software on the platform software. Recently MFP manufacturer provides a plurality of the user authentication systems for platform software of MFP. The user authentication systems include Default Authentication functions, SDL (Simple Device Login) functions and SSO (Single Sign-On) function. The Default Authentication function requires an input of at least department ID and password to a user of MFP to log into MFP. The different department ID is allocated to each department in the office and its relationship is registered in MFP. Therefore only persons know the department ID and password can use MFP. By using the Default Authentication function, MFP administrator can manage the account of the user's usage in each department having the department ID.

The SDL function requires an input of at least a user name and password) to a user of MFP to log into MFP. An administrator of MFP needs to register the user name and password into a hard disk of MFP. Therefore only persons know one's user name and password can use MFP. Also, The SSO function rewires an input of at least a user name and password) to a user of MFP to log into MFP. The SSO function cooperates with a domain controller of a directory server on a network. The user name and password is used to log into network devices like personal computer (PC) on the network. In order to use the SSO function, it is necessary to install a security application module into the PC. Therefore only persons know one's username and password to be used in PC can use MFP. As described above, the current security systems of MFP have a plurality of security functions with a different security level to log into MFP as shown in FIG. 9. The SSO function has most high security level, the SDL function has intermediate security level and the Department ID (Default Authentication function) has most low security level.

Many varieties of memory device go on sale in the world, USB (Universal Serial Bus) memory, SD (Secure Digital) card and CF (Compact Flash) card etc. A user of USB memory device can carry it with huge amount of data freely like a tote bag and connect it to personal computers in an office and home. For enhanced security of the memory device, recently USB memory device having fingerprint authentication system is going sale. There are two types of the USB memory device for the specialized market. The first type of the USB memory device obtains fingerprint of the user by a sensor on the memory device and sends information related to the obtained fingerprint to application software installed into the personal computers in order to register the fingerprint information in the personal computers for the fingerprint authentication. After registering it in the personal computer, when the USB memory device is connected to it and sends to it new fingerprint information obtained by the sensor, the personal computer (PC) executes the application software in order to determine if the new finger print information corresponds with the registered fingerprint information for the fingerprint authentication.

The second type of the USB memory device has a microprocessor and application software for the fingerprint authentication therein. The second type of the USB memory device obtains fingerprint of the user by a sensor on the memory device and registers the fingerprint information therein. After registering it in the USB memory device when the USB memory device is connected to the personal computer, the microprocessor executes the application software in order to determine if the new fingerprint information obtained by the sensor corresponds with the registered fingerprint information for the fingerprint authentication. The second type of the USB memory device has more higher security system than the first type of the USB memory device, since the second type of the USB memory device does not send the fingerprint information outside of the device and sends only a result of the fingerprint authentication to the personal computer.

Recently it has been necessary to use the fingerprint authentication system in MFP in order to enhance its security. However, under the situation, in case that the fingerprint authentication function is installed into MFP in addition to the existing security systems, the user have to input user information (Department ID, a user name, password and fingerprint) according to the security functions to log into MFP.

SUMMARY OF THE INVENTION

The present invention has been made in order to solve at least one of the problems described above. According to an aspect of the present invention, there is security management software to be used in print control device connectable via a network to an information processing device that sends an instruction and data thereto. The software includes: a step of relating a fingerprint of a user of the print control device to information registered for security authentication system on the print control device, wherein the information is to log into the print control device; and a step of allowing the user to log into the print control device, in case that a fingerprint of the user inputted for logging into the print control device is authenticated based on the related fingerprint.

According to another aspect of the present invention, there is a print control device connectable via a network to an information processing device that sends an instruction and data thereto. The print control device includes a controller for relating a fingerprint of a user of the print control device to information registered for security authentication system on the print control device, wherein the information is to log into the print control device and allowing the user to log into the print control device, in case that a fingerprint of the user inputted for logging into the print control device is authenticated based on the related fingerprint.

According to another aspect of the present invention, there is A security management method of a print control device connectable via a network to an information processing device that sends an instruction and data thereto. The method includes: a step of relating a fingerprint of a user of the print control device to information registered for security authentication system on the print control device, wherein the information is to log into the print control device; and a step of allowing the user to log into the print control device, in case that a fingerprint of the user inputted for logging into the print control device is authenticated based on the related fingerprint.

Other features and advantages of the present invention will be apparent from the following description taken in conjunction with the accompanying drawings, in which like reference characters designate the same or similar parts throughout thereof.

DETAILED DESCRIPTION OF THE EMBODIMENTS

A security management software, a security management method and a print control device according to the present embodiment enable allowing a user to log into the print control device with one's fingerprint.

Figure 1:
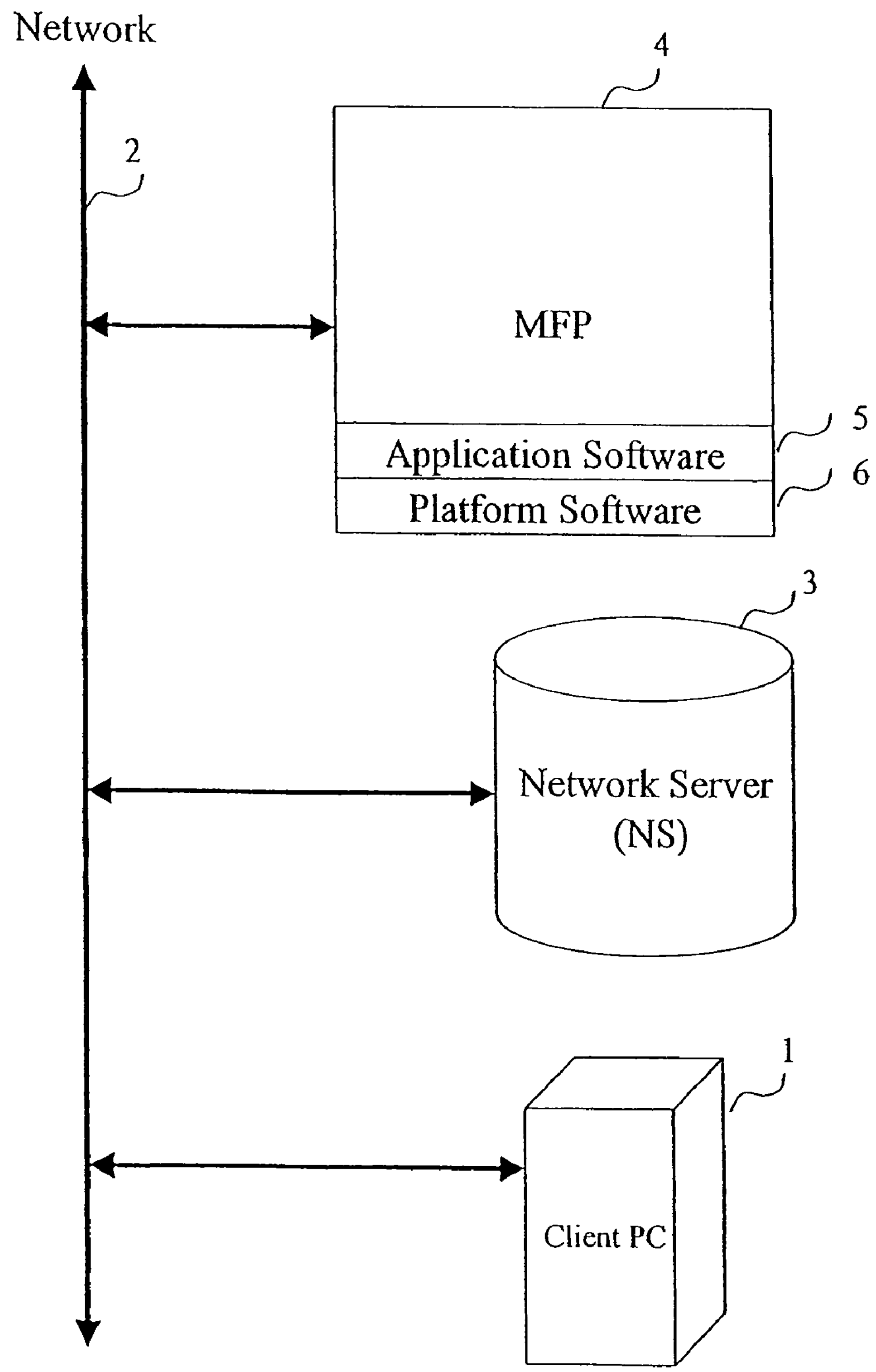
FIG. 1 illustrates relationship between the information processing devices (client PC and Network server) and print control device (MFP) on the network according to an embodiment of the present invention.

In the following, a detailed description will be given of embodiments of the present invention with reference to the accompanied drawings. FIG. 1 illustrates relationship between the information processing devices (personal computers like Client PC 1 and NS 3) and print control device (MFP) on the network according to an embodiment of the present invention. In FIG. 1, reference numeral 1 denotes a Client Personal Computer (information processing device) connected to network 2. Also, reference numeral 3 denotes Network Server (information processing device) connected to network 2 and includes at least domain management software to manage information (a user name and password etc.) to be used in Client PC1 and MFP4 for logging into them. Reference numeral 4 denotes MFP (print control device) that has platform software 6 and executes application software 5 based on the platform software 6. MFP 4 has a plurality of the user authentication systems for platform software 6. The user authentication systems include Default Authentication function, SDL (Simple Device Login) function and SSO (Single Sign-On) function as described in the description of the related art.

Figure 2:
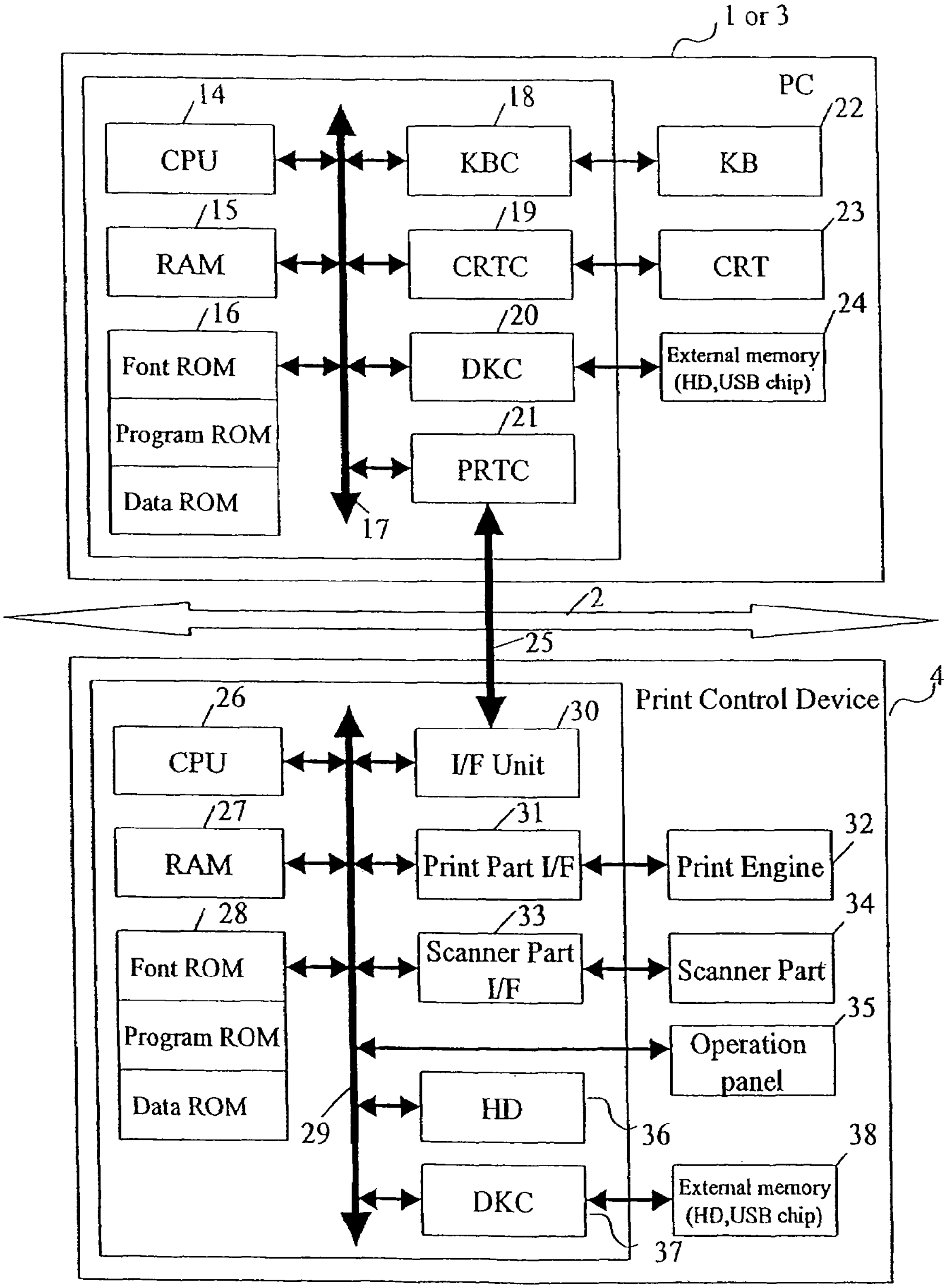
FIG. 2 is a block diagram illustrating a schematic configuration of a document management system including one of the information processing devices according to an embodiment of the present invention.

FIG. 2 is a block diagram illustrating a schematic configuration of a security management system including one of the information processing devices according to an embodiment of the present invention. In this regard, although a security management system is shown as an embodiment, the present invention is not limited to this. The present invention is applied to a network system in which processing is performed by connecting through a network such as a LAN (local area network), WAN (wide area network), etc., as long as it is an environment in which the security management software can be executed.

In FIG. 2, reference numeral 1 denotes one of personal computers (Client PC 1 and NS 3) shown in FIG. 1, and includes a CPU (central processing unit) 14 which executes processing on documents including a combination of graphics, images, characters, tables (including spreadsheets), etc., based on a document processing program, etc., stored in a program ROM of a ROM (read only memory) 16 or an external memory 24 (HD, USB chip and so on). The CPU 14 integrally controls each of the devices connected to a system bus 17. Also, the program ROM of the ROM 16 or the external memory 24 stores an operating system (OS), which is the control program of the CPU 14 and the domain management software, etc., a font ROM of the ROM 16 or the external memory 24 stores font data, etc., to be used for the document processing described above, and a data ROM of the ROM 16 or the external memory 24 stores various data to be used for the above-described document processing and the domain management software, etc. Reference numeral 15 denotes a RAM (random access memory), and functions as a main memory, a work area, etc., of the CPU 14.

Reference numeral 18 is a keyboard controller (KBC), and controls the input from a keyboard 22 and an unillustrated pointing device. Reference numeral 19 is a CRT controller (CRTC), and controls the display of a CRT (cathode ray tube) display 23. Reference numeral 20 is a disk controller (DKC), and controls the access to and from the external memory 24 such as a hard disk (HD), a USB memory device, etc., which store a boot program, various applications including the domain management software, font data, user files, etc.

Reference numeral 21 is a print controller (PRTC), which is connected to a print control device (MFP) 4 through a predetermined bi-directional interface (interface) 25 via the network 2, and executes communication control processing with print control device 4. In this regard, CPU 26 executes, for example, outline-font expansion (rasterization) processing into a display information RAM, which is set in RAM 27, and provides WYSIWYG (what you see is what you get) on CRT 23. Also, CPU 26 opens various registered windows, and executes various data processing based on the commands instructed by an unillustrated mouse cursor, etc., on CRT 23.

In print control device 4, reference numeral 26 is a CPU. CPU 26 outputs an image signal as output information to a print part (printer engine) 32 connected to a system bus 29 based on the control program, etc., stored in a program ROM of a ROM 28 or the control program, etc., stored in HD 36. Also, the program ROM of the ROM 28 stores a control program, etc., of the CPU 26. A font ROM of the ROM 28 stores font data, etc., to be used when the above-described output information is created. A data ROM of the ROM 28 stores information, etc., to be used in Client PC 1 when the print control device 4 does not have a hard disk (HD) 36, etc.

CPU 26 is capable of performing communication processing with Client PC 1 and/or NS 3 through an I/F unit 30. Reference numeral 27 is a RAM which functions as a main memory, a work area, etc., of CPU 26, and the memory capacity thereof can be expanded by an optional RAM connected to an unillustrated expansion port. In this regard, the RAM 27 is used for an output information expansion area, environment data storage area, an NVRAM (Non-Volatile RAM), etc.

Figure 3:
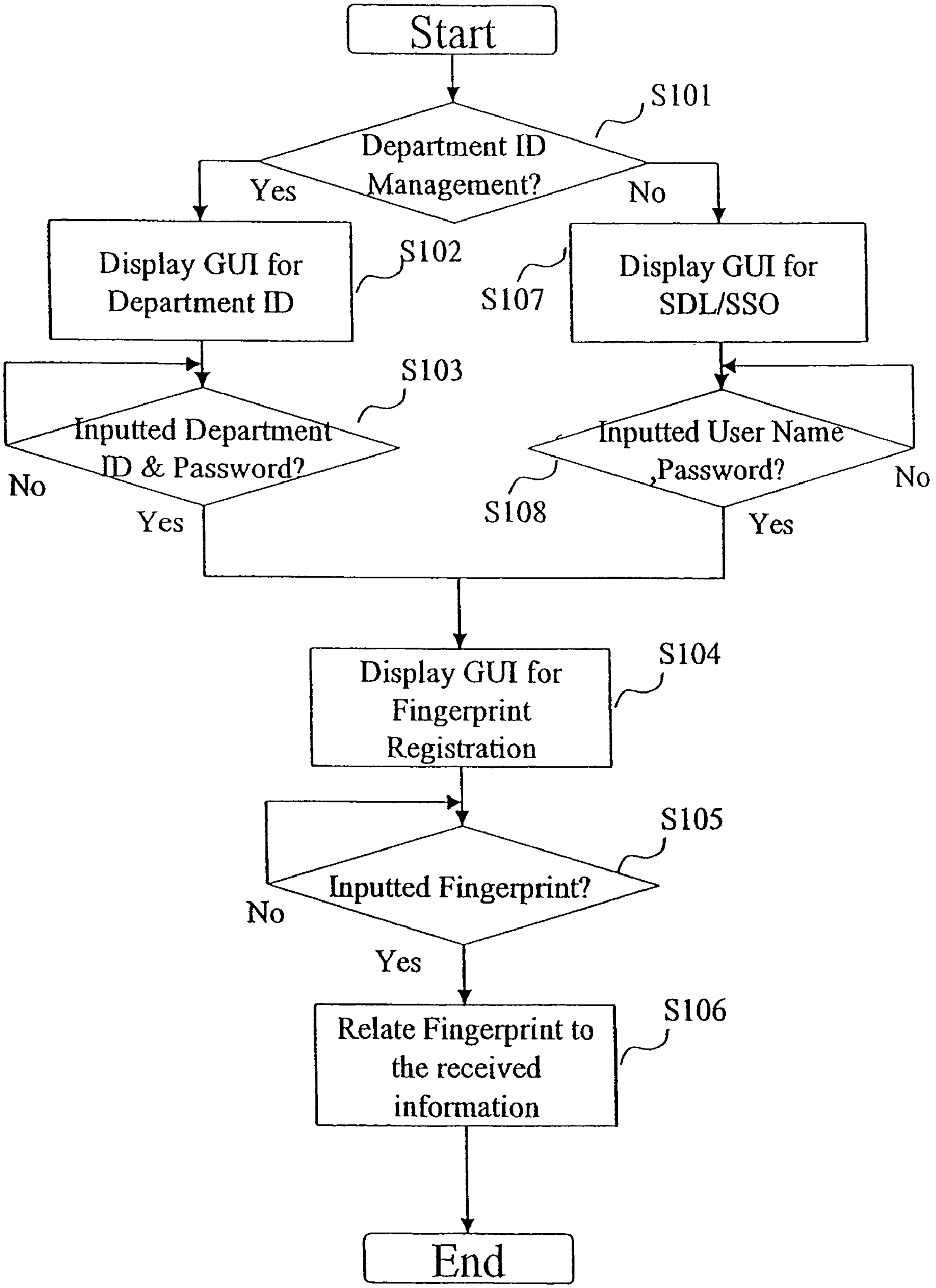
FIG. 3 is a flowchart illustrating a registering process of the security management system to be executed in the MFP.
Figure 4:
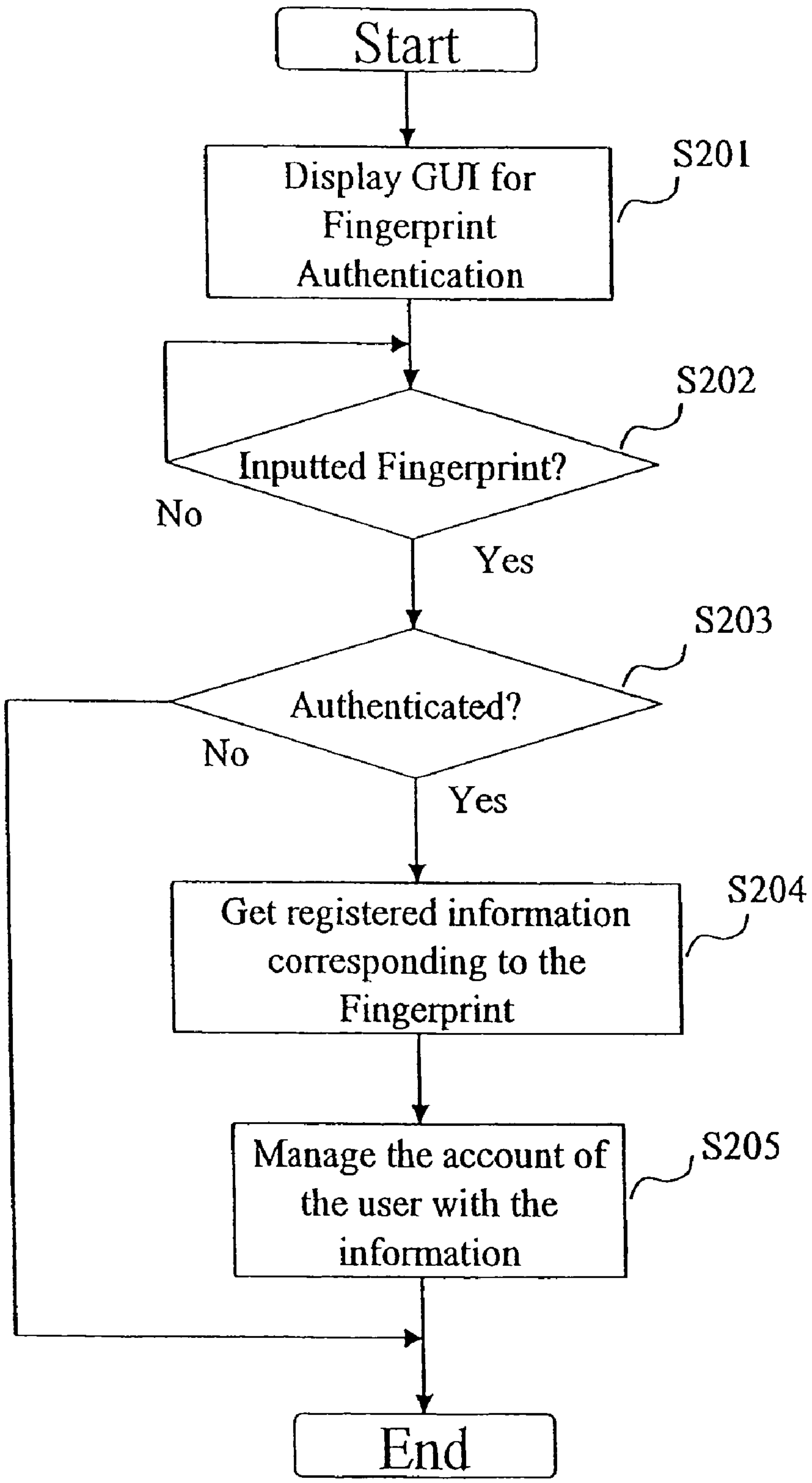
FIG. 4 is a flowchart illustrating an authentication process of the security management system to be executed in the MFP.
Figure 5:
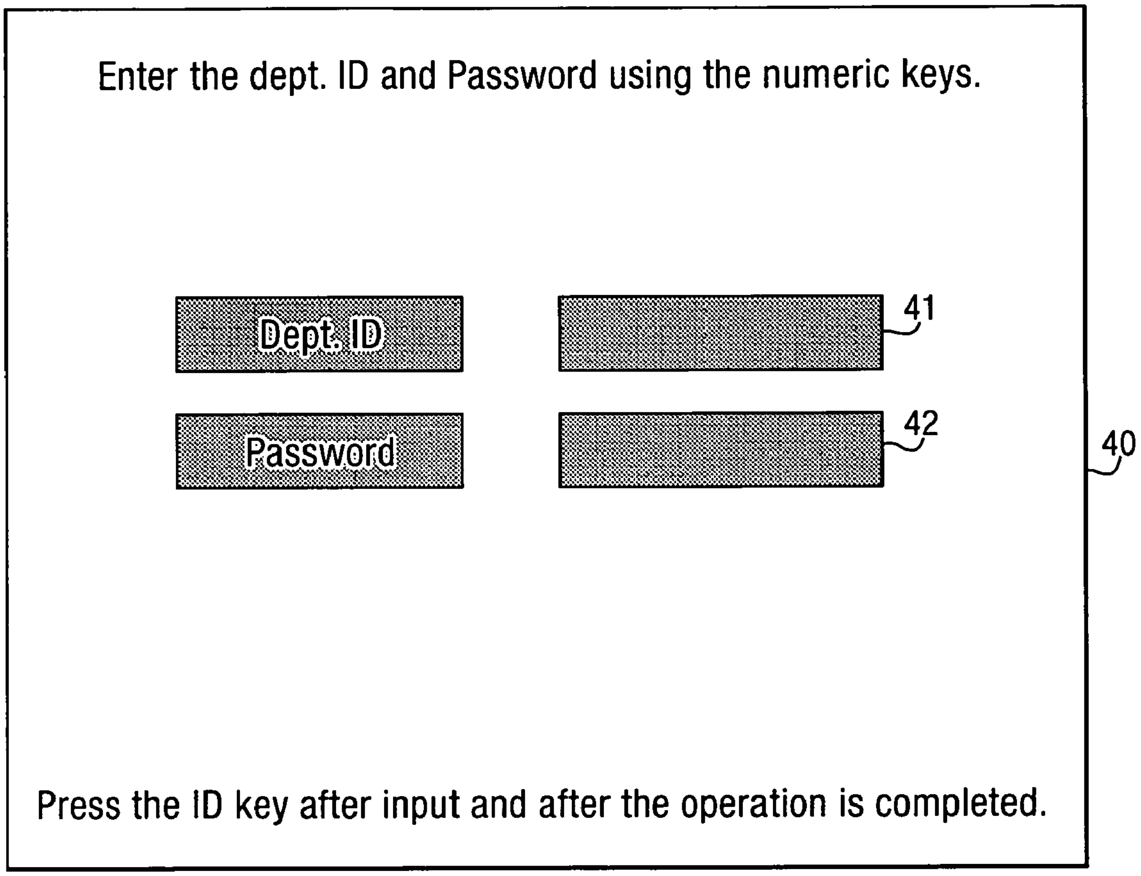
FIG. 5 is a diagram showing an operation window to be displayed on an operation panel of the MFP.

HD 36 stores font data, an emulation program, form data, security management software shown in FIG. 3 and FIG. 4, information related to operation windows shown in FIG. 5 to FIG. 8, etc. Reference numeral 33 is a scanner part I/F and controls documents scanned by scanner part 34 (scanner engine). The scanned document may be printed by print engine 32 and sent to Client PC 1 by using a telephone line in a facsimile mode of print control device 4. The scanned document is stored into external memory 38 like USB memory device. If a user selects documents stored in USB memory device 2, the documents are printed by print engine 32. Also, reference numeral 35 is an operation panel (part) to display the operation windows shown in FIG. 5 to FIG. 8 and receive user instructions. Reference numeral 37 is a disk controller (DKC), and controls the access to and from the external memory 38 such as a hard disk (HD), a USB memory device, etc., which store a boot program, various applications, security management software shown in FIG. 3 and FIG. 4, font data, user files, etc.

FIG. 3 is a flowchart illustrating a registering process of the security management system to be executed in MFP 4 (print control device). If a user selects a registration of one's fingerprint on operation window (menu window) not shown in this embodiment, CPU 26 determines if the department ID management (Default Authentication function) is set up in MFP 4 based on user selection information in step 101. The user can select one of Default Authentication function, SDL function and SSO function and its user selection information is stored in RAM 27 or HD 36 of MFP 4. If Yes in step 101, CPU 26 displays Graphical User Interface (GUI) shown in FIG. 5 in step 102. And then CPU 26 determines if department ID is inputted into box 41 and password is inputted into box 42 of operation window 40 on the operation panel 35 in step 103. The password inputted in step 103 is checked in NS 3 for the user authentication. If the user was authenticated CPU 26 displays GUI shown in FIG. 7 in step 104. CPU 26 determines if the user touches the right-hand field 47 (sensor touch panel) to register the user's fingerprint and select register icon 48 of operation window 40 in step 105. In step 106, CPU 26 relates the registered fingerprint to the inputted information (department ID and password) and stores its relationship information in RAM 27 or HD 36 in step 106.

Figure 6:
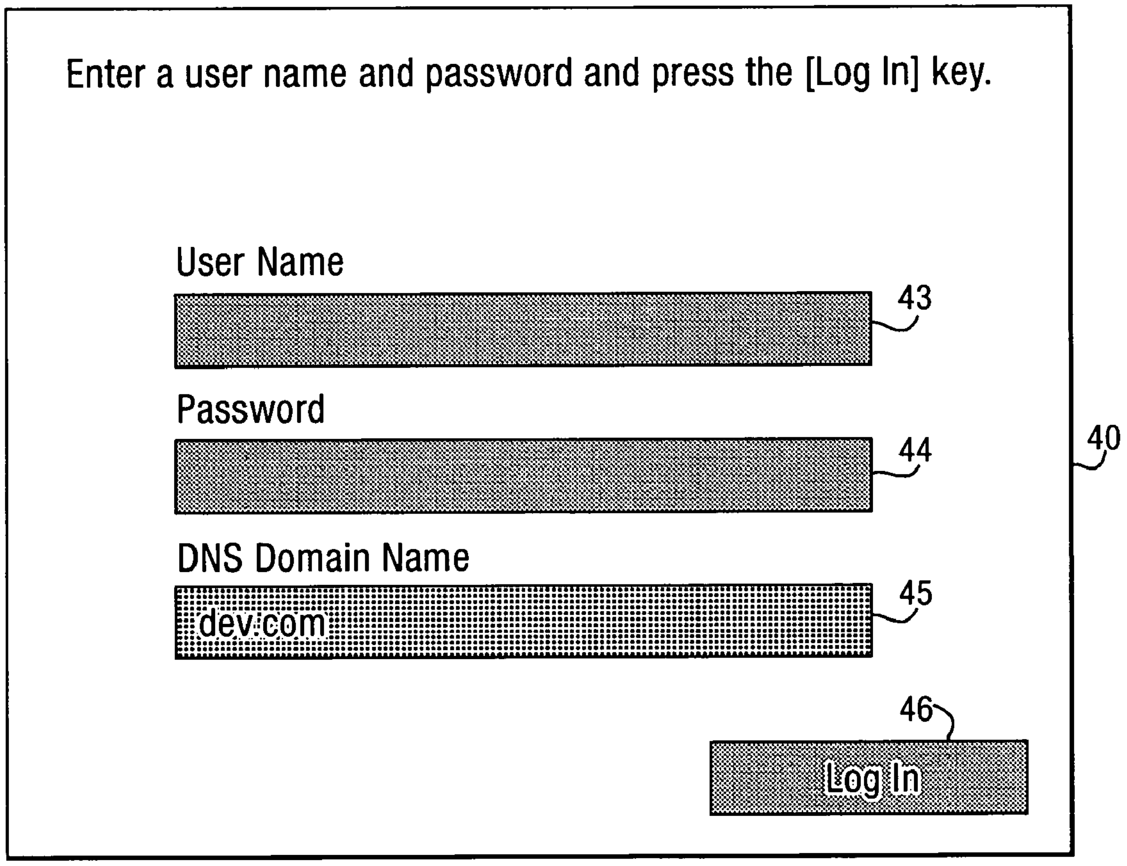
FIG. 6 is a diagram showing an another operation window to be displayed on an operation panel of the MFP.
Figure 7:
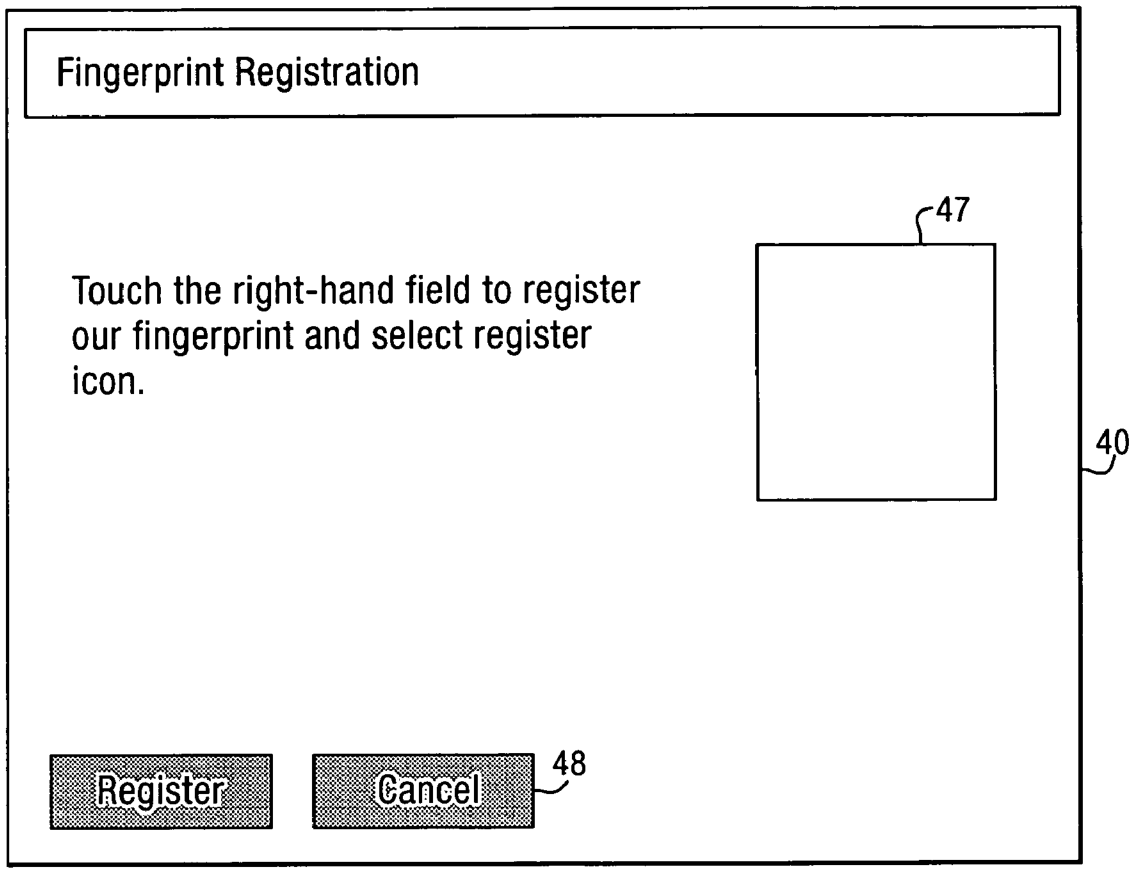
FIG. 7 is a diagram showing an another operation window to be displayed on an operation panel of the MFP.
Figure 8:
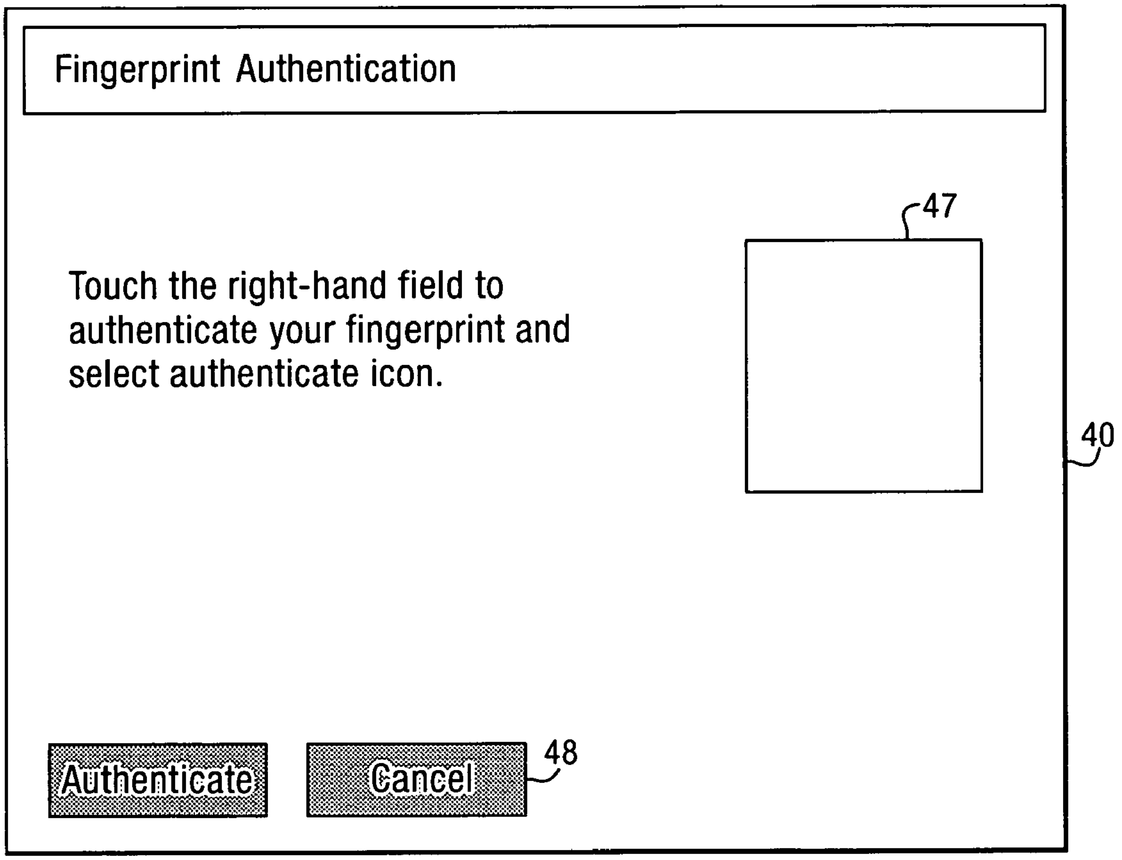
FIG. 8 is a diagram showing an another operation window to be displayed on an operation panel of the MFP.

If No in step 101, CPU 26 displays GUI shown in FIG. 6 in step 107. And then CPU 26 determines if a user name is inputted into box 43 and password is inputted into box 44 of operation window 40 on the operation panel 35 in step 108. The password inputted in step 103 is checked in NS 3 for the user authentication. If the user was authenticated CPU 26 displays GUI shown in FIG. 7 in step 104. CPU 26 determines if the user touches the right-hand field 47 (sensor touch panel) to register the user's fingerprint and select register icon 48 of operation window 40 in step 105. In step 106, CPU 26 relates the registered fingerprint to the inputted information (the user name and password) and stores its relationship information in RAM 27 or HD 36 in step 106. And also, the registered fingerprint is stored in RAM 27 or HD 36. DNS Domain name box 45 is not displayed on the operation panel 35 in step 107, if CPU 26 determines that SDL function is set up in MFP 4 in step 101. DNS Domain name box 45 is displayed on the operation panel 35 in step 107, if CPU 26 determines that SSO function is set up in MFP 4 in step 101. A name of DNS Domain is provided from domain management software in NS 3 and automatically is displayed in the box 45.

FIG. 4 is a flowchart illustrating an authentication process of security management system to be executed in MFP 4. In case that the administrator of MFP 4 sets up fingerprint authentication function in the menu window not shown in this embodiment after registering fingerprints of the users of MFP 4 and the user of MFP 4 logs into MFP 4 or accesses to MFP 4 via web browser of Client PC 1, CPU 26 displays GUI shown in FIG. 8 on operation panel 35 of MFP 4 in step 201. CPU 26 determines if the user touches the right-hand field 47 of operation window 40 on operation panel 35 to authenticate his or her fingerprint and selects authenticate icon 48 on the operation panel 35 in step 202. If Yes in step 202, CPU 26 determines if the fingerprint of the user is stored in RAM 27 or HD 46 in step 203. If Yes in step 203, CPU 26 gets registered information (Department ID, a user name and password) corresponding to the registered fingerprint based on the relationship information in RAM 27 or HD 46 in step 204. And then CPU 26 manages the account of the user with the registered information. Therefore MFP administrator can manage the account of the user's usage using the registered information. Also, MFP administrator can check log information indicating who used MFP 4, when MFP 4 was used and which function was used in MFP 4 etc., since the log information is stored in HD 45 of MFP 4. The fingerprint may be inputted into MFP 4 via the USB memory device having fingerprint authentication system, the USB memory device connected to MFP 4.

Figure 9:
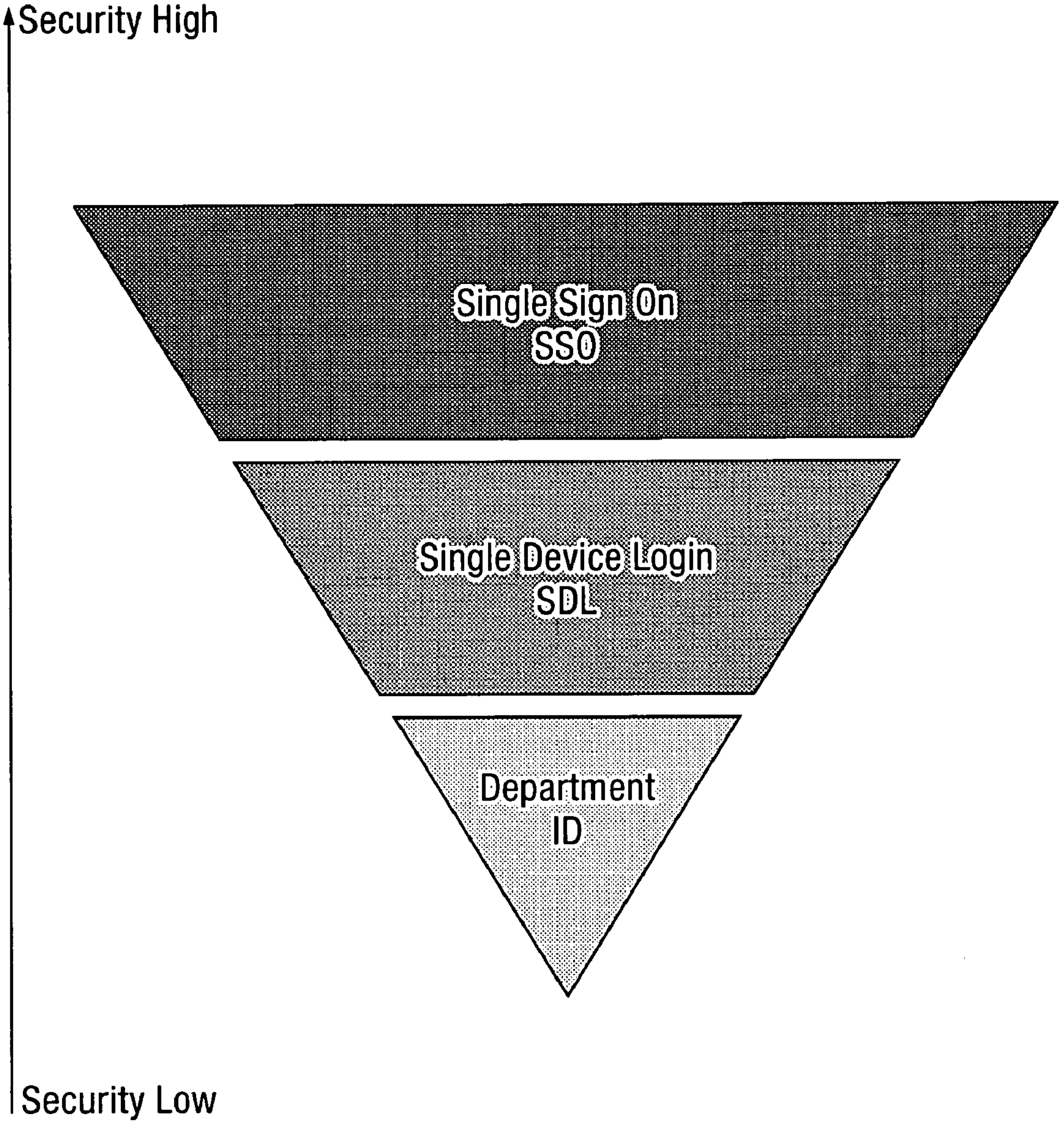
FIG. 9 is a diagram showing security levels of a plurality of traditional security functions to be used in MFP.

As described above, once the user registers his or her fingerprint and relates it to registered information (department ID, a user name and password) in MFP having a plurality of security functions with a different security label to log into the print control device shown in FIG. 9, the user can log into MFP 4 (platform software 6) without inputting registered information (department ID, a user name and password). If a user relates the fingerprint to a registered department ID and password only, the user cannot log into an application that requires SDL/SSO authentication. Similarly, if the user relates the fingerprint to a registered user name and password only, the user cannot log into an application that requires department ID authentication. Therefore if the user relates the fingerprint to both information (department ID & password and user name & password), the user can seamlessly log into all software applications that require any of SSO, SDL and department ID authentication. Further, MFP 4 can keep security levels of the security functions and enhances the security level with the fingerprint authentication function. Also, MFP 4 relates a plurality of different fingerprints of users of MFP 4 to registered common information like department ID for security authentication system. Therefore MFP administrator can manage a group of users with their fingerprints.

Also, in the above-described embodiment, various functions are achieved by reading the programs for achieving the functions in Client PC 1, NS 3 or MFP 4 into the memory (RAM) and the CPU executing these functions. However, the invention is not limited to this, and all of the processing or part of the functions may be achieved by dedicated hardware. Also, the above-described memory may be constituted by a non-volatile memory such as a magnetic optical disk unit, a flash memory, etc., a read-only recording medium such as a CD-ROM, etc., a volatile memory other than a RAM, or a computer-readable and writable recording medium by the combination of these.

Also, a program for achieving various processing functions in Client PC 1, NS 3, MFP 4 may be recorded into a computer-readable recording medium, and the program code recorded in the recording medium may be read into a computer system, and each processing may be performed by executing the program code. In this regard, a "computer system" mentioned here includes an OS, hardware such as a peripheral device, etc.

Also, a "computer-readable recording medium" means a portable medium such as a flexible disk, a magnetic optical disk, a ROM, a CD-ROM, etc., and a storage device such as a hard disk contained in a computer system. Furthermore, a "computer-readable recording medium" includes a device for holding a program for a certain period of time such as an internal volatile memory (RAM) of a computer system to be a server or a client when the program is transmitted through a network such as the Internet, etc., and a communication line such as a telephone line, etc.

Also, the above-described program may be transmitted from a computer system storing the program in a storage device, etc., through a transmission medium, or may be transmitted to another computer system by a transmitted wave in the transmission medium. Here, a "transmission medium" for transmitting the program means a medium having an information transmission function such as a network (communication network), for example, the Internet, etc., and the communication line such as a telephone line, etc. Also, the above-described program may achieve part of the above-described functions. Furthermore, the program may achieve the above-described functions by combining with the program that is already recorded in a computer system, that is to say, the program may be a differential file (differential program).

Also, a program product such as a computer-readable recording medium which records the above-described program may be applied to an embodiment of the present invention. The above-described program, recording medium, a transmission medium, and the program product are included in the scope of the present invention. As described above, a detailed description has been given of the embodiments of the present invention with reference to the drawings. However, a specific structure is not limited to the embodiments, and a design, etc., are included within the spirit and scope of the present invention.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. Security management software, embodied in a computer-readable medium, to be used in a print control device connectable via a network to an information processing device that sends an instruction and data thereto, the print control device having a security authentication system with a plurality of security functions with different security levels and having a plurality of applications, at least two of the applications having different security levels, the software comprising codes for performing the steps of:

relating a fingerprint of a user of the print control device to a plurality of sets of information registered for the security authentication system on the print control device, wherein the information is to log into the print control device, and wherein different sets of information are related to different security levels, allowing the user to log into the print control device, in the case that a fingerprint of the user inputted for logging into the print control device is authenticated based on the related fingerprint, and allowing the user to access at least one of the plurality of applications in the case that the inputted fingerprint is authenticated based on the related fingerprint at the respective security level of the at least one of the plurality of applications.

2. The software according to claim 1, wherein one of the security functions requires the information to log into the print control device, wherein the information includes at least a department ID.

3. The software according to claim 1, wherein one of the security functions requires the information to log into the print control device, wherein the information includes at least a user name.

4. The software according to claim 3, wherein the user name is registered on the print control device for its authentication.

5. The software according to claim 3, wherein the user name is used to log into the information processing device.

6. The software according to claim 1, further comprising the step of managing the account of the user with the information.

7. The software according to claim 1, wherein the fingerprint is input from a USB device having a fingerprint authentication unit.

8. The software according to claim 1, wherein the security management software is stored in a memory medium.

9. The software according to claim 1, wherein the relating steps relates a plurality of different fingerprints of users of the print control device to common information registered for the security authentication system on the print control device.

10. The software according to claim 1, wherein the fingerprint of a user of the print control device is related to both SDL/SSO authentication information and department ID authentication information.

11. A print control device connectable via a network to an information processing device that sends an instruction and data thereto, the print control device having a plurality of applications, at least two of the applications having different security levels, the print control device comprising:

a security authentication system with a plurality of security functions with different security levels, and a controller for:

relating a fingerprint of a user of the print control device to a plurality of sets of information registered for the security authentication system on the print control device, wherein the information is to log into the print control device, and wherein different sets of information are related to different security levels, allowing the user to log into the print control device, in the case that a fingerprint of the user inputted for logging into the print control device is authenticated based on the related fingerprint, and allowing the user to access at least one of the plurality of applications in the case that the inputted fingerprint is authenticated based on the related fingerprint at the respective security level of the at least one of the plurality of applications.

12. A security management method of a print control device connectable via a network to an information processing device that sends an instruction and data thereto, the print control device having a security authentication system with a plurality of security functions with different security levels and having a plurality of applications, at least two of the applications having different security levels, the method comprising the steps of:

relating a fingerprint of a user of the print control device to a plurality of sets of information registered for the security authentication system, wherein the information is to log into the print control device, wherein different sets of information are related to different security levels, allowing the user to log into the print control device, in the case that a fingerprint of the user inputted for logging into the print control device is authenticated based on the related fingerprint, and allowing the user to access at least one of the plurality of applications in the case that the inputted fingerprint is authenticated based on the related fingerprint at the respective security level of the at least one of the plurality of applications.

* * * * *